United States Patent
Wang et al.

(10) Patent No.: US 12,432,217 B2
(45) Date of Patent: Sep. 30, 2025

(54) DIGITAL CONTENT DELIVERY WITH PRIVACY-PRESERVING MEMBERSHIP CHECK

(71) Applicant: Google LLC, Mountain View, CA (US)

(72) Inventors: Gang Wang, Frederick, MD (US); Yue Wang, Los Altos, CA (US); Chin-Yet Lin, San Jose, CA (US)

(73) Assignee: Google LLC, Mountain View, CA (US)

( * ) Notice: Subject to any disclaimer, the term of this patent is extended or adjusted under 35 U.S.C. 154(b) by 101 days.

(21) Appl. No.: 18/394,070

(22) Filed: Dec. 22, 2023

(65) Prior Publication Data

US 2024/0214385 A1 Jun. 27, 2024

Related U.S. Application Data

(60) Provisional application No. 63/434,988, filed on Dec. 23, 2022.

(51) Int. Cl.
*H04L 9/40* (2022.01)
*G06F 21/62* (2013.01)

(52) U.S. Cl.
CPC ........ *H04L 63/104* (2013.01); *G06F 21/6227* (2013.01)

(58) Field of Classification Search
CPC ............... H04L 63/104; G06F 21/6227; G06F 21/6254; G06F 21/6245
See application file for complete search history.

(56) References Cited

U.S. PATENT DOCUMENTS

| | | | | |
|---|---|---|---|---|
| 9,298,934 B1* | 3/2016 | Sang | ..................... | H04L 63/105 |
| 9,679,314 B1* | 6/2017 | Wang | .................. | G06F 16/9535 |
| 10,878,335 B1* | 12/2020 | Waugh | .................... | G06F 40/30 |
| 10,970,393 B1* | 4/2021 | Stiles | .................... | G06F 21/554 |
| 11,347,808 B1* | 5/2022 | Plenderleith | ........ | G06F 16/2455 |
| 12,273,466 B2* | 4/2025 | Eom | ..................... | H04L 9/0825 |
| 2013/0010950 A1* | 1/2013 | Kerschbaum | ......... | H04L 9/3218 380/30 |

(Continued)

FOREIGN PATENT DOCUMENTS

WO    WO 2022192152    9/2022

OTHER PUBLICATIONS

International Search Report and Written Opinion in International Appln. No. PCT/US2023/085660, mailed on Apr. 26, 2024, 12 pages.

(Continued)

*Primary Examiner* — Darren B Schwartz
(74) *Attorney, Agent, or Firm* — Fish & Richardson P.C.

(57) ABSTRACT

Methods, systems, and apparatus, including computer programs encoded on a computer storage medium, for selecting and providing digital contents to a client device are described. The system receives a request including a user membership probabilistic data structure encoding user membership information, and constructs, based on the user membership probabilistic data structure, a query for identifying candidate digital components that are eligible for distribution to users. The system obtains the set of candidate digital components by querying one or more digital component databases using the constructed query, selects, from the candidate digital components, one or more digital components, and provides the one or more digital components to the client device for presentation to the user.

19 Claims, 4 Drawing Sheets

(56) References Cited

U.S. PATENT DOCUMENTS

| | | | | |
|---|---|---|---|---|
| 2013/0031367 | A1* | 1/2013 | Mao | H04L 63/10 |
| | | | | 713/168 |
| 2013/0339526 | A1* | 12/2013 | Ruellan | H04L 67/568 |
| | | | | 709/226 |
| 2014/0223575 | A1* | 8/2014 | Nandi | H04N 21/4826 |
| | | | | 726/27 |
| 2015/0220625 | A1* | 8/2015 | Cartmell | G06F 16/9014 |
| | | | | 707/754 |
| 2017/0264531 | A1* | 9/2017 | Mahyar | G06N 7/01 |
| 2017/0300718 | A1* | 10/2017 | Geinitz | H04L 63/0428 |
| 2017/0372094 | A1* | 12/2017 | Hore | H04L 63/0428 |
| 2019/0147178 | A1* | 5/2019 | Baldwin | H04L 51/52 |
| | | | | 726/28 |
| 2019/0213349 | A1* | 7/2019 | Luo | H04L 63/0227 |
| 2020/0359207 | A1* | 11/2020 | Lee | H04L 67/30 |

OTHER PUBLICATIONS

Luo et al., "Optimizing bloom filter: Challenges, solutions, and comparisons." IEEE Communications Surveys & Tutorials 21.2, Dec. 2018, 1912-1949.

Wikipedia.org [online], "Bloom Filter" created on Apr. 2004, retrieved on Jun. 14, 2024, retrieved from URL <https://en.wikipedia.org/wiki/Bloom_filter>, 25 pages.

Wikipedia.org [online], "Cuckoo filter" created on Nov. 2018, retrieved on Jun. 14, 2024, retrieved from URL <https://en.wikipedia.org/wiki/Cuckoo_filter>, 3 pages.

* cited by examiner

DIGITAL CONTENT DELIVERY WITH PRIVACY-PRESERVING MEMBERSHIP CHECK

CROSS-REFERENCE TO RELATED APPLICATIONS

This application claims the benefit of U.S. Provisional Patent Application No. 63/434,988, filed Dec. 23, 2022, the entirety of which is incorporated herein by reference and for all purposes.

TECHNICAL FIELD

This specification is generally related to data processing, cryptography, data privacy, and data security, and in particular, related to digital content delivery using secure, efficient, and privacy preserving membership checks.

BACKGROUND

Data security and user privacy are vital in systems and devices connected to public networks, such as the Internet. The enhancement of user privacy has led many developers to change the ways in which user data is handled. For example, some browsers are planning to deprecate the use of third-party cookies.

SUMMARY

This specification describes methods, computer systems, and apparatus, including computer programs encoded on computer storage media, for more efficiently performing membership checks using probabilistic data structures and using the membership checks to select and provide digital content to client devices in privacy-preserving manners.

In one innovative aspect, this specification describes a method for distributing digital components to a client device. The method can be implemented by a system including one or more computers. The method can include receiving, from a client device of a user, a request comprising a user membership probabilistic data structure encoding user membership information that indicates membership of the user in one or more user groups of multiple user groups, wherein each user group of the multiple user groups has a respective unique group identifier that identifies the user group; constructing, based on the user membership probabilistic data structure, a query for identifying candidate digital components that are eligible for distribution to users that are members of the one or more user groups; obtaining the set of candidate digital components by querying one or more digital component databases using the constructed query; selecting, from the candidate digital components, one or more digital components; and providing the one or more digital components to the client device for presentation to the user. Other implementations of this aspect include corresponding apparatus, systems, and computer programs, configured to perform the aspects of the methods, encoded on computer storage devices.

These and other implementations can each optionally include one or more of the following features. In some aspects, the probabilistic data structure includes one of a Bloom filter or a cuckoo filter.

In some aspects, each digital component database includes a set of digital components and, for each digital component, one or more respective probabilistic data structures that each encodes a user group to which the digital component is eligible to be distributed.

In some aspects, constructing the query includes generating a Boolean expression based on values of bits of the user membership probabilistic data structure and values of bits of the one or more respective probabilistic data structures for each digital component in the set of digital components.

In some aspects, each digital component database includes a set of cells along a row or column of the digital component database for storing the values of the bits of the one or more respective probabilistic data structures for the digital components, the set of cells include a respective cell for each digital component in the digital component database, and the respective cell for each digital component comprises the values of the bits of at least one of the one or more respective probabilistic data structures for the digital component. Obtaining the set of candidate digital components by querying the one or more digital component databases using the constructed query can include evaluating, for each digital component in the digital component database, the Boolean expression based on the values of the bits in the respective cell for the digital component.

In some aspects, the client device generates the user membership probabilistic data structure by generating, for each individual user group that includes the user as a member and using a given hash function, a hash value based on a combination of (i) the unique group identifier for the individual user group and (ii) a unique owner identifier for an owner of the individual user group; selecting, for each hash value, a predefined number of bits of the hash value, wherein the predefined number of bits is greater than one but less than all of the bits of each hash value; and populating the user membership probabilistic data structure using the selected predefined number of bits for each individual user group that includes the user as a member.

In some aspects, the user membership probabilistic data structure comprises a Bloom filter bit array. Populating the user membership probabilistic data structure using the selected predefined number of bits for each individual user group that includes the user as a member can include determining, using the respective predefined number of bits of the respective individual user group, a respective set of bit positions in the Bloom filter bit array and setting each of elements at the determined set of bit positions of the Bloom filter bit array to a value of 1.

In some aspects, the Boolean expression includes, for each respective probabilistic data structure of the one or more probabilistic data structures in the digital component database, a respective Boolean operation on the bits of the Bloom filter bit array and the bits in the respective probabilistic data structure.

In some aspects, the user membership probabilistic data structure includes a cuckoo filter array. Populating the user membership probabilistic data structure using the selected predefined number of bits for each individual user group that includes the user as a member can include determining, using the respective predefined number of bits of the respective individual user group, a respective tag bit string and a set of possible positions for inserting the tag bit string into the cuckoo filter array and inserting the respective tag bit string into the cuckoo filter array at one of the set of possible positions.

In some aspects, the Boolean expression includes, for each respective probabilistic data structure of the one or more probabilistic data structures in the digital component database, a respective Boolean operation for checking tag bit string matching at the set of possible positions in the cuckoo filter array.

Particular embodiments of the subject matter described in this specification can be implemented so as to realize one or more of the following advantages. The solutions described in this specification reduce privacy risks associated with storing and transmitting potentially sensitive user data while improving efficiencies of data storage, data transmission, and data retrieval. In one aspect, a client device of a user encodes user membership information, which identifies user groups that include the user as a member, into a probabilistic data structure, and transmits the probabilistic data structure from the client device to a trusted server to perform a query to obtain digital content, e.g., digital components, to provide to the client device for presentation to the user. The probabilistic data structure encodes the user membership information in an encrypted and compressed manner, and thus provides data privacy and security for sensitive user data, as well as improving data storage and transmission efficiencies for the client devices. The improved data storage and transmission efficiencies translate into fewer storage resources required to store the data and less network bandwidth required for transmitting the data.

Additionally, the system encodes distribution criteria of digital components into probabilistic data structures, and stores the probabilistic data structures in databases with the corresponding digital components, or with a reference to the digital components. This provides privacy and security of distribution criteria data for digital content providers, e.g., content platforms, and improves data storage and transmission efficiency for the trusted server and digital component repositories.

Further, the system can construct and perform content selection queries directly based on the probabilistic data structures without accessing sensitive user data or user group information of distribution criteria in their unencrypted forms, enhancing the data privacy and security of the user membership data as the system performing the queries does not have access to the membership information in cleartext. The queries can be constructed using efficient Boolean operations based on bits of the user membership probabilistic data structure received from a client device and probabilistic data structures stored in databases that encode user group information used for distributing the digital components. As a result, the queries can be executed in an efficient and privacy-preserving manner. That is, compared to performing queries after decrypting the membership information and distribution criteria, fewer computation resources (e.g., CPU resources) are required to execute the queries to select digital components to deliver to the user, and data security and privacy are maintained during the construction and execution of the queries.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for selecting and distributing digital components to client devices in ways that protect user privacy and confidential data of content platforms and/or digital component providers. A trusted server can be configured to perform digital component selection processes that use sensitive user data so that the user data is not provided to any other entity. The trusted server can host and execute the selection logic of various content platforms when selecting digital components based on user data in manners that ensure that no other entity can access the selection logic of the content platform and such that the selection logic is not capable of sending any user data from the trusted server. In this way, both the data of the users and the content platforms is kept secure. The user data can be encoded in probabilistic data structures, e.g., Bloom filters or cuckoo filters and the probabilistic data structures can be used to construct queries for digital components based on the user data without the system performing the querying having access to the user data in cleartext, thereby enhancing the data privacy and security of the overall digital component distribution process.

Figure 1:
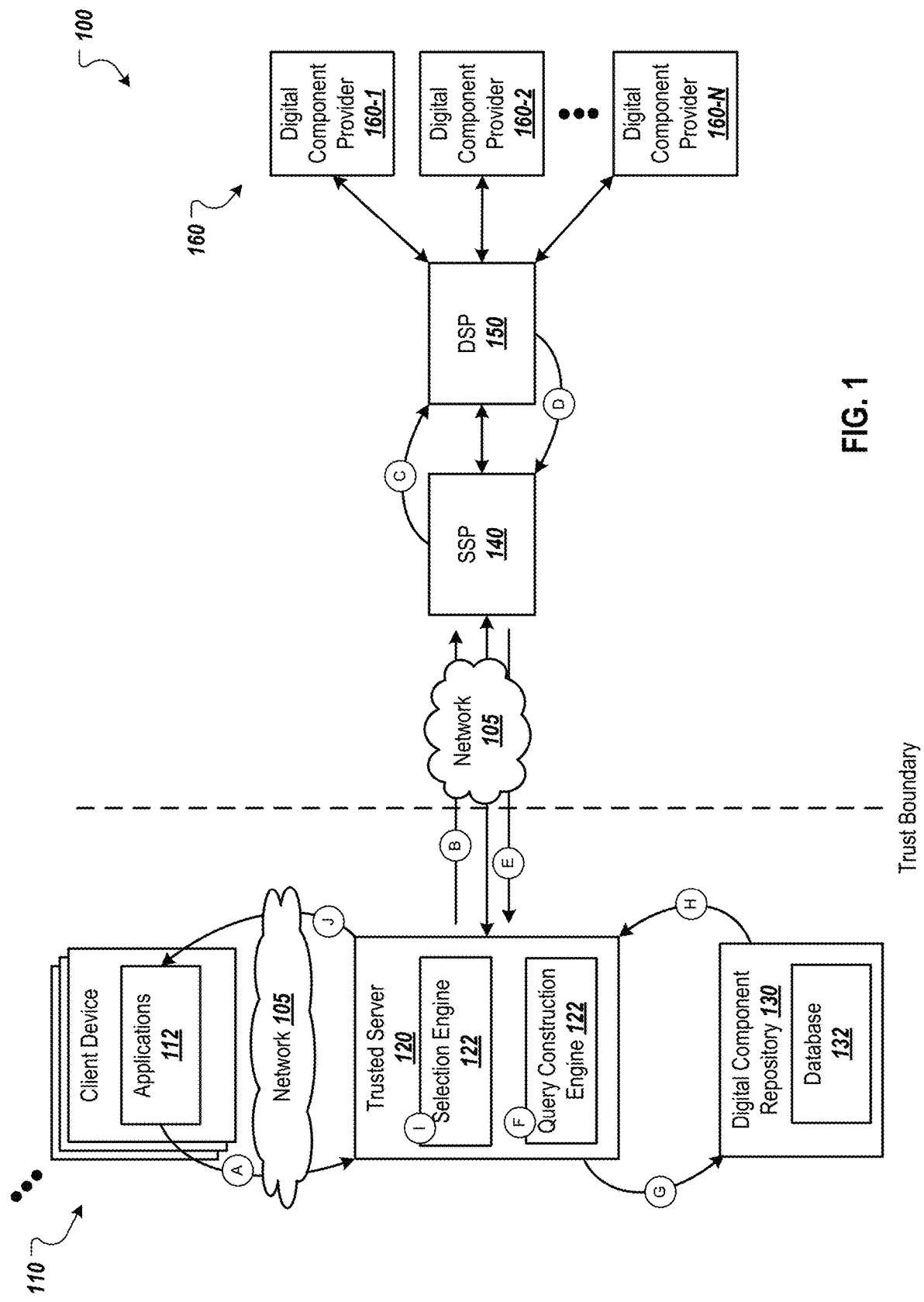
FIG. 1 is a block diagram of an example environment in which a trusted server distributes digital components to client devices in a privacy-preserving manner.

FIG. 1 is a block diagram of an example environment 100 in which a trusted server 120 distributes digital components to one or more client devices 110 in a privacy-preserving manner. The environment 100 includes a data communication network 105, such as a local area network (LAN), a wide area network (WAN), the Internet, a mobile network, or a combination thereof. The data communication network 105 connects client devices 110 to the trusted server 120 and connects the trusted server 120 to content platforms, such as supply side platforms (SSPs) 140 and/or demand side platforms (DSPs) 150. The network 105 can also connect the various content platforms to one another and/or to digital component providers 160, e.g., to servers of the digital component providers 160. The components in the environment 100, including, for example, the client devices 110, the trusted server 120, the digital component repository 130, the SSPs 140, and the DSPs 150, are examples of systems that be implemented as computer programs on one or more computers in one or more locations, in which the systems, components, and techniques described below can be implemented.

A client device 110 is an electronic device that is capable of communicating over the network 105. Example client devices 110 include personal computers, server computers, mobile communication devices, e.g., smartphones and/or tablet computers, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smartphone, a speaker device, a tablet device, or another hardware device. A client device can also include a digital media device, e.g., a streaming device that plugs into a television or other display to stream videos to the television, a gaming device, or a virtual reality system.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

A client device 110 can include applications 112, such as web browsers and/or native applications, to facilitate the sending and receiving of data over the network 105. A native application is an application developed for a particular platform or a particular device (e.g., mobile devices having a particular operating system). Although operations may be described as being performed by the client device 110, such operations may be performed by an application 112 running on the client device 110.

The applications 112 can present electronic resources, e.g., web pages, application pages, or other application content, to a user of the client device 110. The electronic resources can include digital component slots for presenting digital components with the content of the electronic resources. A digital component slot is an area of an electronic resource (e.g., web page or application page) for displaying a digital component. A digital component slot can also refer to a portion of an audio and/or video stream (which is another example of an electronic resource) for playing a digital component.

An electronic resource is also referred to herein as a resource for brevity. For the purposes of this document, a resource can refer to a web page, application page, application content presented by a native application, electronic document, audio stream, video stream, or other appropriate types of electronic resources with which a digital component can be presented.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement the content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource that includes a digital component slot, the application 112 can generate a digital component request that requests a digital component for presentation in the digital component slot. In some implementations, the digital component slot and/or the resource can include code (e.g., scripts) that cause the application 112 to request a digital component from the trusted server 120.

A digital component request sent by a client device 110 can include sensitive user data related to a user of the client device 110 and/or non-sensitive data. The sensitive user data can include, for example, data identifying user groups that include the user as a member. The user groups can include interest-based groups. Each interest-based group can include a topic of interest and a set of members identified (e.g., determined or predicted) to be interested in the topic. The user groups can also include, for example, groups of users that performed particular actions at electronic resources (e.g., websites or native applications) of publishers. For example, a user group can include users that visited a website, users that requested more information about an item, interacted with (e.g., selected) a particular digital component and/or added an item to a virtual cart to potentially acquire the item. The user data for a user can also include user profile data and/or attributes of the user.

Further to the descriptions throughout this document, a user may be provided with controls (e.g., user interface elements with which a user can interact) allowing the user to make an election as to both if and when systems, programs, or features described herein may enable the collection of user information (e.g., information about a user's social network, social actions, or activities, profession, a user's preferences, or a user's current location), and if the user is sent the content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A digital component request can also include contextual data, which is generally considered non-sensitive. The contextual data can be related to, e.g., describe, the environment in which a selected digital component will be presented. The contextual data can include, for example, coarse location information indicating a general location of the client device 110 that sent the digital component request, a resource (e.g., website or native application) with which the selected digital component will be presented, a spoken language setting of the application 112 or client device 110, the number of digital component slots in which digital components will be presented with the resource, the types of digital component slots, and/or other appropriate contextual information.

The trusted server 120 can be implemented using one or more server computers (or other appropriate computing devices), that may be distributed across multiple locations. In general, the trusted server 120 receives requests for digital components from client devices 110, selects digital components based on data included in the requests, and sends the selected digital components to the client devices 110.

As the trusted server 120 receives sensitive user data, the trusted server 120 can be operated and maintained by an independent trusted party, e.g., a party that is different from the users of the client devices, the parties that operate the SSPs 140 and DSPs 150, and the digital component providers 160. For example, the trusted server 120 can be operated by an industry group or a governmental group.

As described in more detail below, the trusted server 120 can select a digital component from a set of digital components stored in a digital component repository 130 and/or a set of digital components received from an SSP 140. The digital component repository 130 stores digital components received from content platforms (e.g., from SSPs 140 and/or DSPs 150) and additional data (e.g., metadata) for each digital component. The metadata for a digital component can include, for example, distribution criteria that define the situations in which the digital component is eligible to be provided to a client device 110 in response to a digital component received from the client device 110 and/or a selection parameter that indicates an amount that will be provided to the publisher if the digital component is displayed with a resource of the publisher and/or interacted with by a user when presented. For example, the distribution criteria for a digital component can include location information indicating which geographic locations the digital component is eligible to be presented, user group membership data identifying user groups to which the digital component is eligible to be presented, resource data identifying resources with which the electronic resource is eligible to be presented, and/or other appropriate distribution criteria. The distribution criteria can also include negative criteria, e.g., criteria indicating situations in which the digital component is not eligible, e.g., with particular resources or in particular locations. Other data that can be used to select a digital component can also be stored in the digital component repository with a reference, e.g., a link or as metadata, to its digital component. The digital component repository 130 can store the digital components and the metadata in one or more databases in a pre-defined data format.

An SSP 140 is a technology platform implemented in hardware and/or software that automates the process of obtaining digital components for the resources. Publishers of resources can use an SSP 140 to manage the process of obtaining digital components for digital component slots of its resources. Each publisher can have a corresponding SSP 140 or multiple SSPs 140. Some publishers may use the same SSP 140.

A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources of multiple different publishers. Digital component providers 160 can create or otherwise publish digital components that are presented in digital component slots of the publisher's resources.

In this example, user data do not cross a trust boundary 190 that separates the client device 110, the trusted server 120, and the digital component repository from the SSP 140, DSP 150, and digital component providers 160. In this way, no entity other than the client device 110 and the trusted server 120 receives the user data that is included in a digital component request. This preserves user privacy and data security, especially when compared to techniques that employ third-party cookies to send user data across the Internet.

An example process for selecting and providing a digital component for presentation at a client device 110 is illustrated in stages A-I, which illustrate a flow of data between the components of the environment 100.

In stage A, the application 112 sends a digital component request to the trusted server 120. As described above, the application 112 can send a digital component request to request a digital component for presentation in a digital component slot of a resource being presented by the application 112. The digital component request can include user data and contextual data. In some implementations, the user data of digital component requests can include a user membership probabilistic data structure, e.g., a Bloom filter or a cuckoo filter, that encodes user membership information. The user membership information is information indicating the memberships of the user of the client device 110, or the client device 110 itself, in one or more of multiple user groups. The user groups can include, for example, interest-based groups that include users determined to have an interest in a particular topic, groups of users that performed particular actions at electronic resources of publishers (e.g., having visited a website or requested information about an item), groups of users having particular attributes (e.g., located within particular geographical areas), groups of users using particular user devices having particular attributes (e.g., a device running a particular operating system), a device in a locked mode or an unlocked mode, or a device accessing the Internet using particular types of networks), and/or other appropriate types of user groups. Each user group has a respective unique group identifier that identifies the user group.

In stage B, the trusted server 120 sends a context-based digital component request to an SSP 140. The context-based digital component request can include the contextual data of the digital component request received from the application 112. However, the context-based digital component request does not include any of the user data, e.g., does not include the user membership probabilistic data structure. The trusted server 120 can temporarily store the user data while waiting for a response from the SSP 140. The trusted server 120 can send the context-based digital component request to an SSP 140 for the publisher of the resource being presented by the application 112.

In stage C, the SSP 140 forwards the context-based digital component request to one or more DSPs 150. In stage D, each DSP 150 sends, to the SSP 140, one or more selection parameters for one or more digital components, e.g., digital components stored in the digital component repository 130. For example, the DSP 150 can select a digital component based on the contextual data of the context-based request and determine a selection parameter for the digital component based on the contextual data. The DSP 150 can also provide a digital component and selection parameter, e.g., a digital component that is not stored in the digital component repository 130. Each DSP 150 can send a selection parameter with data indicating the digital component to which the selection parameter applies, e.g., by including an identifier for the digital component or a reference to the digital component. The digital components for which selection parameters are provided by the DSPs 150 can be referred to as context-based digital components.

In stage E, the SSP 140 sends the digital components and/or selection parameter to the trusted server 120. In some implementations, the SSP 140 can filter digital components and/or selection parameters prior to sending the digital components and/or selection parameters to the trusted server 120. For example, the SSP 140 can filter digital components and/or selection parameters based on publisher controls specified by the publisher of the resource being presented by the application 112. In a particular example, a publisher of a web page about a particular event may define, as a publisher control, that digital components related to another event may not be presented with this web page. The SSP 140 can filter based on rules or other data provided by the publisher.

In stage F, the trusted server 120 constructs a query based on the user data included in the digital component request. In particular, the query can be constructed based on the user membership probabilistic data structure. The query is used to identify and retrieve candidate digital components that are eligible for distribution to users that are members of the one or more user groups encoded in the user membership probabilistic data structure. In other words, the query is used to identify and retrieve candidate digital components that are eligible for presentation to user groups that include the user of the client device 110 that sent the digital component request, or the client device itself 110, as a member.

In stage G, the trusted server 120 queries the digital component repository 130 for a set of user-based digital components that are selected based on the user data of the digital component request. For example, the trusted server 120 can submit the query constructed in stage F that defines, as conditions of the query, the user data of the digital component request. In particular, the trusted server 120 can query one or more digital component databases 132 stored in the digital component repository 130 using the constructed query to obtain a query result specifying the set of user-based digital components that are selected based on the user data of the digital component request.

In some implementations, the query can also include context-based conditions. For example, a query can request retrieval of digital components that include, as distribution criteria, types of digital components, the spoken language of text, audio, or video of digital components, a geographic area identified by coarse location information, and so on. Although shown after stages B-F, the trusted server 120 can query the digital component repository 130 in parallel with these stages to reduce the latency in selecting and providing a digital component to the application 112.

In stage H, the trusted server 120 receives a set of candidate digital components from the digital component repository 130. The set of candidate digital components can include those having distribution criteria that match the conditions of the query. The trusted server 120 can further receive, e.g., from the digital component repository 130, a selection parameter for each candidate digital component. In some implementations, the digital component database(s) can store a selection parameter for each digital component and/or for each set of distribution criteria for a digital component. For example, a DSP 150 can provide multiple sets of distribution criteria for each digital component and each set can have a different selection parameter that is valid when the distribution criteria is satisfied (e.g., matches) the content of a digital component request.

In stage I, a selection engine 122 of the trusted server 120 selects a digital component to provide to the application 112 for presentation in the digital component slot. The selection engine 122 can select the digital component from a set of candidate digital components that includes the candidate digital components received from the SSP and the candidate digital components received from the digital component repository 130. The selection engine 122 can select the digital component from this set of candidate digital components based on the selection parameter for each digital component in the set of candidate digital components. For example, the selection engine 122 can select the digital component having the highest selection parameter. In some implementations, the selection engine 122 can select the digital component based on a score for each candidate digital component. The score for each candidate digital component can be based on a combination, e.g., product of, the selection parameter for the candidate digital component and a predicted performance, e.g., predicted user interaction rate, for the candidate digital component.

In stage J, the trusted server 120 provides the selected digital component to the application 112. The application 112 can then present the digital component with the resource being presented by the application 112.

Figures 2A, 2B:
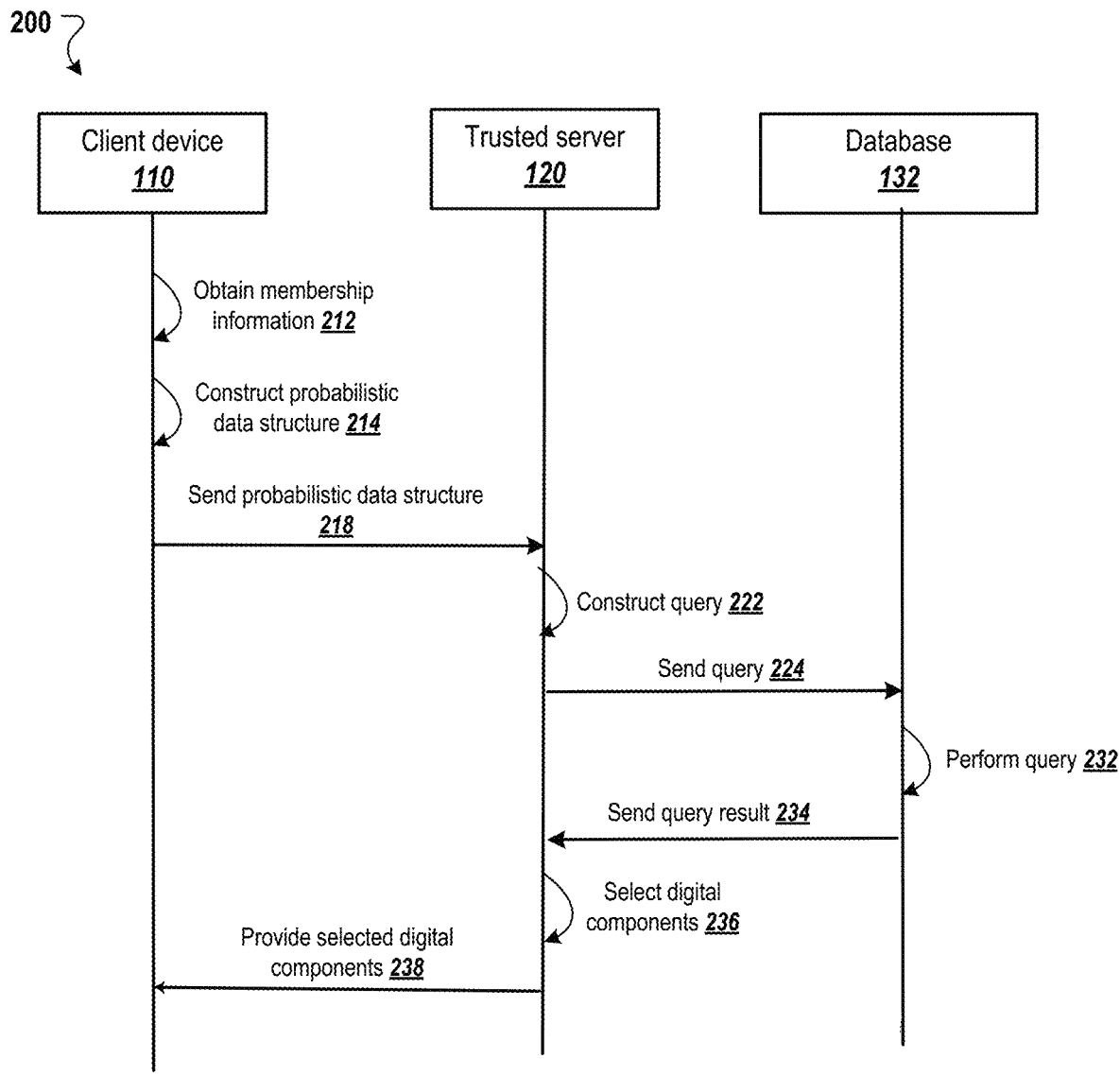
FIG. 2A is a swim lane flow diagram of an example process for selecting and providing a digital component for presentation at a client device in a privacy-preserving manner.
FIG. 2B illustrates a portion of an example digital component database.

FIG. 2A is a swim lane flow diagram of an example process 200 for selecting and providing a digital component for presentation a client device in a privacy-preserving manner. Operations of the process 200 can be implemented, for example, by a client device 110, a trusted server 120, and a database 132. Operations of the process 200 can also be implemented as instructions stored on one or more computer-readable media, which may be non-transitory, and execution of the instructions by one or more data processing apparatus can cause the one or more data processing apparatus to perform the operations of the process 200.

The client device 110 obtains membership information of a user (212). The user membership information is information indicating memberships of a particular user in one or more of multiple user groups. That is, the membership information can specify which of the user groups the particular user belongs as a member. The user groups can include one or more user groups defined by an operating system or a software platform of the client device 110. In addition or alternatively, the user groups can include one or more user groups defined by one or more digital content providers, or one or more third parties such as government agencies or regulatory organizations. The user groups can include, for example, interest-based groups, groups of users that performed particular actions at electronic resources of publishers, groups of users having particular attributes, or groups of users using particular user devices having particular attributes, and/or other appropriate types of user groups. In general, each of the user groups has a respective unique group identifier that identifies the user group. The membership information can indicate the group identifier for each user group that includes the user as a member.

In some implementations, the client device 110 can obtain the membership information of the user from data received by and/or stored on the client device 110, such as user login data, user account data, device configuration data, sensor data, device status data, device operation logs, user browsing histories, and/or other appropriate information. For example, the client device 110 can maintain, at the client device 110 and as the user membership information, a user group list that includes the user group identifier for each user group that includes the user as a member. The client device 110 can add a user group identifier to the user group list based on the information of the user and/or in response to external requests, e.g., a request received from a content platform or publisher.

At 214, the client device 110 constructs a probabilistic data structure that encodes the user membership information. A probabilistic data structure is a data structure that encodes and approximates raw data in a probabilistic manner. The probabilistic data structure can be used to encode the user membership information in an encrypted and compressed manner, thus improving data privacy and security as well as data storage and transmission efficiency. Any suitable algorithms can be used to construct the probabilistic data structure to encode the user membership information. For example, the probabilistic data structure can include a Bloom filter or a cuckoo filter. Compared to some other encryption data structures, both the Bloom filter and the cuckoo filter can provide significant advantages in space efficiency for encoding membership sets. This reduces storage requirements, e.g., consumed memory, and consumed bandwidth when sending the data structure between devices, which can also reduce latency in data transmissions.

In some implementations, the client device 110 constructs the user membership probabilistic data structure based on respective hash values computed for each respective individual user group that includes the user as a member. The respective hash values can be computed using a given hash function, e.g., an HMAC-SHA256 function or an HMAC-SHA512 function, on respective global identifiers of the individual user groups. The global identifier for an individual user group can be a combination, e.g., a concatenation, of the unique group identifier for the individual user group and a unique owner identifier for an owner of the individual user group. The owner of the individual user group can be an entity that defines the individual user group. For example, the unique owner identifier for a particular user group can be the identifier, e.g., a numerical and/or character string, that identifies a digital content provider or DSP 150 that defined the particular user group and/or that requests client devices to add users to the particular user group.

To construct the user membership probabilistic data structure, for each individual user group that includes the user as a member, the client device 110 can select a predefined number of bits of the respective hash value of the individual user group, and populate the user membership probabilistic data structure using the selected predefined number of bits. In general, the predefined number of bits is greater than one but can be less than all of the bits of each hash value. For example, if the hash value of an identifier of a particular user group has 256 bits, the client device 110 can select 128 bits, e.g., the first 128 bits, the last 128 bits, or another combination of 128 bits, from the hash value to populate the probabilistic data structure.

In some implementations, the user membership probabilistic data structure includes a Bloom filter. A Bloom filter includes a bit array of m bits. Initially, each bit is set to a value of 0. A typical approach to populate a Bloom filter with a particular user group identifier includes determining a set of k bit positions based on the selected bits of the hashed value of the particular identifier, and setting the bit value at each of the k bit positions in the Bloom filter bit array to 1. This process can be repeated to insert multiple user group identifiers into the bit array.

In one particular example, for each respective individual user group that includes the user as a member, the client device 110 can select $m=k \times l$ bits from the n-bit respective hash value, e.g., the 256-bit hash value computed using the HMAC-SHA256 function, of the global identifier of the respective individual user group, where k is the number of bit positions to be populated in the Bloom filter array, l is the number of bits representing each bit position in the Bloom filter array, and $1<m<n$. For example, the client device 110 can select the first 128 bits of the 256-bit hash value to compute 8 bit positions with each bit position identified by a 16-bit value, and set each of the 8 bit positions in the Bloom filter bit array to a value of 1 to insert the particular user group into the Bloom filter array.

In some implementations, the user membership probabilistic data structure includes a cuckoo filter. The cuckoo filter includes a cuckoo filter array, which can be understood as a set of multiple buckets each having multiple entries. The cuckoo filter array can be initialized to 0 values. To insert a respective individual user group that includes the user as a member, the client device 110 can insert a respective tag value (also known as a fingerprint) of the individual user group into a respective position of the cuckoo filter array. The tag value is a bit string and can be determined from a set of selected bits of the hash value computed for the respective individual user group. For example, the tag value can be the first τ bits of the hash value. The insertion position, e.g., the index of the bucket into which the tag value is inserted can be determined by additional bits selected from the hash value. The client device 110 can use this process to insert each respective individual user group that includes the user as a member into the cuckoo filter array. If a collision occurs during insertion, i.e., when a particular position in the cuckoo filter array has already been occupied by another tag value, the client device 110 can use cuckoo hashing to resolve the collision. As a result, each tag value is inserted into the cuckoo filter array at one of a set of possible positions.

At 218, the client device 110 sends a request including the user membership probabilistic data structure that encodes the user membership to the trusted server 120. Since the probabilistic data structure (e.g., the Bloom filter or the cuckoo filter) encodes the user membership information in an encrypted and compressed manner, data privacy and security as well the bandwidth efficiency are provided for the data transmission.

After receiving the request including the user membership probabilistic data structure, the trusted server 120 constructs a query for identifying candidate digital components that are eligible for distribution to users that are members of at least one of the one or more user groups that include the user as a member at 222, and queries one or more digital component databases 132 using the constructed query at 224 to obtain the set of candidate digital components.

In some implementations, each digital component database 132 stores a set of digital components and, for each digital component, one or more respective probabilistic data structures (or data representing the one or more respective probabilistic data structures) that each encodes one or more user groups to which the digital component is eligible to be distributed. For example, each digital component database 132 can include a set of cells along a row or column of the digital component database for storing the values of the bits of a data structure for the digital components. The set of cells include a respective cell for each digital component in the digital component database, and the respective cell for each digital component includes the values of the bits of at least one of the one or more respective probabilistic data structures for the digital component.

FIG. 2B illustrates a portion of an example of a digital component database 132a. As shown in FIG. 2B, a first column of cells of the database 132a store the set of digital components including digital component #1, digital component #2, digital component #3, and so on. The database 132a includes a second column of cells that store bit values of a probabilistic data structure that encodes a user group to which the corresponding digital component is eligible to be distributed. The database 132a can include additional columns of cells for storing bits of probabilistic data structures that encode additional user groups to which the corresponding digital component is eligible to be distributed.

Referring back to FIG. 2A, to construct the query, the trusted server 120 can generate a Boolean expression based on values of bits of the user membership probabilistic data structure and values of bits of the one or more respective probabilistic data structures for each digital component in the set of digital components, e.g., the values of the bits in the respective cell for the respective digital component.

In some implementations, the user membership information is encoded using Bloom filters. That is, the user membership probabilistic data structure of a particular user includes a Bloom filter that encodes the respective global group identifier of each of the one or more user groups that include the particular user as a member. In the digital component database, for each particular digital component, each of the one or more probabilistic data structures also uses a Bloom filter, or bits of the Bloom filter, to encode a particular user group to which the digital component is eligible to be distributed.

In an illustrative example, assume that the Bloom filter of the user membership probabilistic data structure includes a bit array of $\{q_1, q_2, \ldots, q_m\}$, and the digital component database includes probabilistic data structures for encoding a first target user group with a first bit array of $\{a_1, a_2, \ldots, a_m\}$, a second target user group with a second bit array of $\{b_1, b_2, \ldots, b_m\}$, and a third target user group with a third bit array of $\{c_1, c_2, \ldots, c_m\}$. The constructed query can be represented by:

SELECT <column_name>
FROM <table_name>
WHERE <other conditions>
AND ( $((q_1$ OR NOT $a_1)$ AND $(q_2$ OR NOT $a_2)$ AND $\ldots$
$(q_m$ OR NOT $a_m))$ OR $((q_1$ OR NOT $b_1)$ AND $(q_2$ OR NOT $b_2)$
AND $\ldots (q_m$ OR NOT $b_m))$ OR $((q_1$ OR NOT $c_1)$ AND $(q_2$ OR NOT $c_2)$
AND $\ldots (q_m$ OR NOT $c_m))$

)

In the above example, the membership-related conditions are represented by a Boolean expression:

$((q_1$ OR NOT $a_1)$ AND $(q_2$ OR NOT $a_2)$ AND $\ldots$
$(q_m$ OR NOT $a_m))$ OR $((q_1$ OR NOT $b_1)$ AND $(q_2$ OR NOT $b_2)$
AND $\ldots (q_m$ OR NOT $b_m))$ OR $((q_1$ OR NOT $c_1)$ AND $(q_2$ OR NOT $c_2)$
AND $\ldots (q_m$ OR NOT $c_m))$  (1)

based on the values of bits of the user membership probabilistic data structure $\{q_1, q_2, \ldots, q_m\}$ and values of bits of the respective probabilistic data structures $\{a_1, a_2, \ldots, a_m\}$, $\{b_1, b_2, \ldots, b_m\}$, and $\{c_1, c_2, \ldots, c_m\}$ for each digital component in the set of digital components.

More specifically, to evaluate whether the user is a member of a particular user group (e.g., the first user group) that the digital component is eligible to be distributed to, an "OR" Boolean operation is applied to the bit value of each particular bit position of the membership probabilistic data structure $q_i$ and the "NOT" of the bit value of the corresponding bit position in the bit array of the probabilistic data structure of the particular target user group as ($q_i$ OR NOT $a_i$), and "AND" operations are applied to "OR" Boolean expressions of all the bit positions as:

$((q_1$ OR NOT $a_1)$ AND $(q_2$ OR NOT $a_2)$ AND $\ldots$
$(q_m$ OR NOT $a_m))$.  (1a)

Similarly, the Boolean expression for determining whether the user is a member of the target user group can be defined as:

$((q_1$ OR NOT $b_1)$ AND $(q_2$ OR NOT $b_2)$ AND $\ldots$
$(q_m$ OR NOT $b_m))$,  (1b)

and the Boolean expression for determining whether the user is a member of the second user group can be defined as:

$((q_1$ OR NOT $c_1)$ AND $(q_2$ OR NOT $c_2)$ AND $\ldots$
$(q_m$ OR NOT $c_m))$  (1c)

In the above particular example, the Boolean expression (1) that represents the membership-related conditions can be expressed as an OR operation applied to multiple Boolean expressions for multiple target user groups, e.g., (1a), (1b), and (1c). This represents that a particular digital component is selected by the constructed query if the user is a member of one or more of the user groups for the particular digital component. That is, if the user is a member is of any of the first, the second, or the third user group, the particular digital component is selected by the constructed query.

In general, the Boolean expression representing the membership conditions in the constructed query can be any appropriately defined logical operations combining the conditions for multiple target user groups, according to specific applications. In one example, one of the target groups (e.g., the third target group represented by $\{c_1, c_2, \ldots, c_m\}$) can instead be defined as a "blocklist" user group that the particular digital component should not be distributed to, and the membership condition can be defined as ((1a) OR (1b)) AND NOT (1c).

In some implementations, the user membership information is encoded using a cuckoo filter. That is, the user membership probabilistic data structure of a particular user includes a cuckoo filter array that encodes the respective global group identifier of each of the one or more user groups that includes the particular user as a member. In the digital component database, for each particular digital component, each of the one or more probabilistic data structures specifies the tag bit string and the set of possible positions for inserting the tag bit string into the cuckoo filter array for a target user group.

To construct the query for a user membership probabilistic data structure including a cuckoo filter array, the trusted server 120 can generate a Boolean expression that compares the tag bit strings in the probabilistic data structures for the digital components in the digital component database 132 with bit strings in the user membership probabilistic data structure received from the client device 110. For example, for a particular probabilistic data structure in the digital component database, the Boolean expression compares the tag bit string in the particular probabilistic data structure with each of the bit strings at the set of possible positions in the cuckoo filter array received from the client device 110. If the tag bit string in the particular probabilistic data structure matches a bit string in any of the possible positions in the cuckoo filter array, the Boolean expression returns a "True" output. Thus, for a user membership probabilistic data structure using cuckoo filter encoding, the constructed query only needs to check tag bit string matching at specific possible positions (typically 2-4 positions for each tag bit string) in the probabilistic data structure in the Boolean expression. This approach in general can further improve processing efficiency compared to using a Bloom filter to encode the user membership information, where the constructed query may need to check many bit positions in the Bloom filter array.

Conditions other than user membership conditions can also be included in queries. The other conditions can include one or more contextual conditions. That is, the query condition includes both the contextual conditions as well as the membership conditions specified by the Boolean expression that compares the tag bit strings in the probabilistic data structures for the digital components in the digital component database 132 with bit strings in the user membership probabilistic data structure received from the client device 110. A contextual condition can indicate a contextual signal of the digital component request. This contextual signal can be compared to contextual signals for digital components, as described below.

After constructing the query, the trusted server 120 sends the constructed query to the digital component database 132 at 224. The digital component database 132 performs the query at 232 to obtain a query result that includes a set of candidate digital components that satisfy the query condition, and sends the query result 234 to the trusted server 120.

Performing the query to identify the digital components that satisfy the query condition can include identifying digital components for which each condition of the query is satisfied, e.g., each membership condition and/or each contextual condition of the query is satisfied. The membership check conditions can be evaluated as described above using probabilistic data structures. For contextual conditions, a digital component can have distribution criteria that indicates a set of one or more contextual signals for which the digital component is eligible for distribution or ineligible for distribution. For example, first digital component may be eligible for distribution to users in a particular city, e.g., where an evet that is the subject of the content of the digital component will occur, while a second digital component may not be eligible for presentation on a particular web page. These contextual-based conditions can be specified in distribution criteria stored in the digital component database 132.

At 236, the trusted server 120 selects one or more digital components from the candidate digital components. The trusted server 120 can select the digital components from the set of candidate digital components based on a selection parameter (e.g., a score) for each digital component in the set. For example, the trusted server 120 can select the digital component having the highest score.

A 238, the trusted server 120 provides the selected digital components to the client device 110. The client device 110 can then present the selected digital components, e.g., by presenting the selected digital components in one or more digital component slots in one or more applications of the client device 110.

Figure 3:
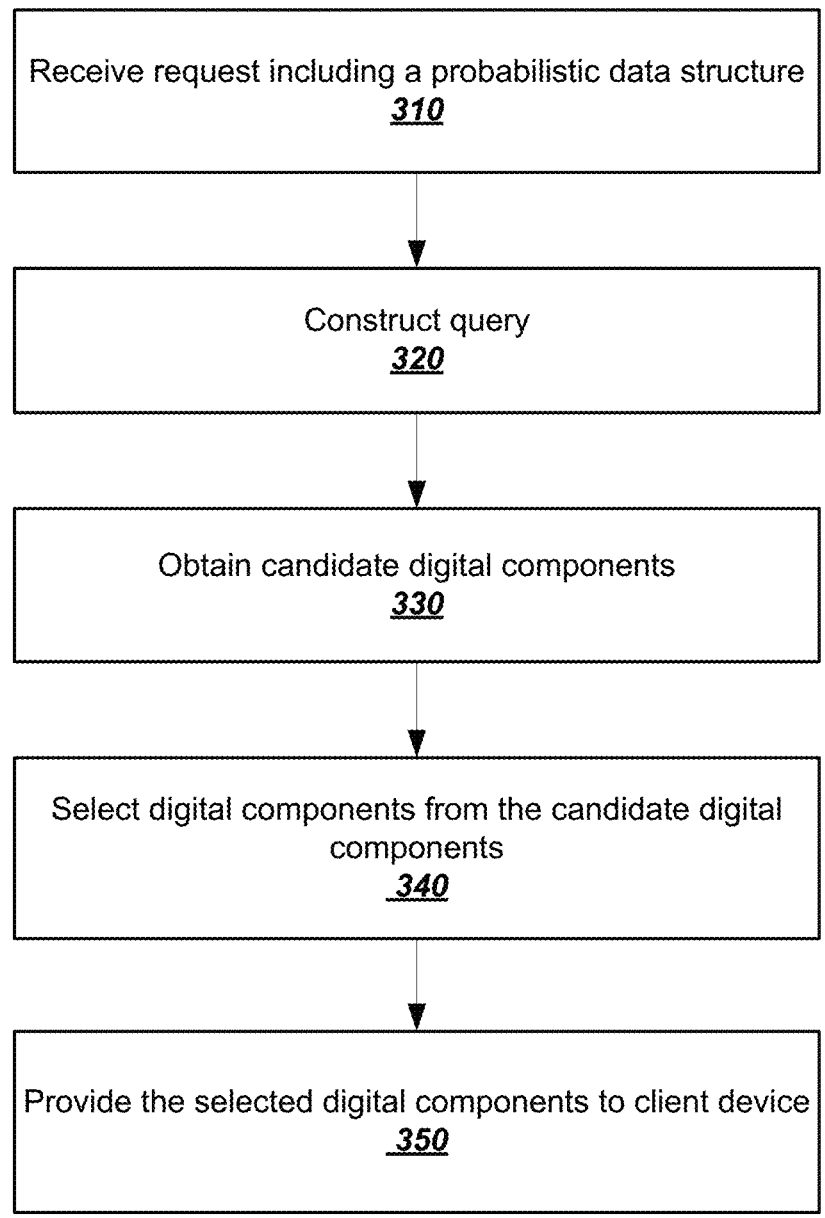
FIG. 3 is a flow diagram of an example process for selecting and providing a digital component for presentation on a client device in a privacy-preserving manner.

FIG. 3 is a flow diagram of an example process 300 for selecting and providing a digital component for display on a client device in a privacy-preserving manner. Operations of the process 300 can be performed by a system of one or more computers located in one or more locations, such as a server, e.g., the trusted server 120 described with reference to FIG. 1, appropriately programmed in accordance with this specification, can perform the process 300. Operations of the process 300 can also be implemented as instructions stored on one or more computer-readable media, which may be non-transitory, and execution of the instructions by one or more data processing apparatus can cause the one or more data processing apparatus to perform the operations of the process 300. For convenience and without loss of generality, the process 300 will be described as being performed by a computer system.

At 310, the computer system receives, from a client device of a user, a request for digital components. The request includes a user membership probabilistic data structure that encodes user membership information that indicates membership of the user in one or more user groups of multiple user groups. In general, each user group of the multiple user groups has a respective unique group identifier that identifies the user group, and the user membership probabilistic data structure can encode the unique group identifiers of the user groups in which the user is a member.

Any suitable algorithms can be used to construct the probabilistic data structure to encode the user membership information. For example, the probabilistic data structure can include a Bloom filter or a cuckoo filter. In some implementations, to generate the user membership probabilistic data structure, the client device generates, for each individual user group that includes the user as a member and using a given hash function, a hash value based on a combination of (i) the unique group identifier for the individual user group and (ii) a unique owner identifier for an owner of the individual user group. The client device selects, for each hash value, a predefined number of bits of the hash value, wherein the predefined number of bits is greater than one but less than all of the bits of each hash value, and populates the user membership probabilistic data structure using the selected predefined number of bits for each individual user group that includes the user as a member.

In one example, the user membership probabilistic data structure includes a Bloom filter bit array. To generate the user membership probabilistic data structure, the client device determines, using the respective predefined number of bits of the respective individual user group, a respective set of bit positions in the Bloom filter bit array, and sets each of the elements at the determined set of bit positions of the Bloom filter bit array to a value of 1.

In another example, the user membership probabilistic data structure includes a cuckoo filter array. To generate the user membership probabilistic data structure, the client device determines, using the respective predefined number of bits of the respective individual user group, a respective tag bit string and a set of possible positions for inserting the tag bit string into the cuckoo filter array, and inserts the respective tag bit string into the cuckoo filter array at one of the set of possible positions.

At 320, the computer system constructs, based on the user membership probabilistic data structure, a query for identifying candidate digital components that are eligible for distribution to users that are members of the one or more user groups.

In some implementations, each digital component database includes a set of digital components and, for each digital component, one or more respective probabilistic data structures that each encodes a user group to which the digital component is eligible to be distributed. To construct the query, the computer system can generate a Boolean expression based on values of bits of the user membership probabilistic data structure and values of bits of the one or more respective probabilistic data structures for each digital component in the set of digital components.

In one example, the user membership probabilistic data structure includes a Bloom filter bit array. The Boolean expression of the constructed query can include, for each respective probabilistic data structure of the one or more probabilistic data structures in the digital component database, a respective Boolean operation for checking tag bit string matching at the set of possible positions in the cuckoo filter array.

In another example, the user membership probabilistic data structure includes a cuckoo filter array. The Boolean expression of the constructed query can include, for each respective probabilistic data structure of the one or more probabilistic data structures in the digital component database, a respective Boolean operation for checking tag bit string matching at the set of possible positions in the cuckoo filter array of the user membership probabilistic data structure.

At 330, the computer system obtains the set of candidate digital components by querying one or more digital component databases using the constructed query.

For example, each digital component database can include a set of cells along a row or column of the digital component database for storing the values of the bits of the one or more respective probabilistic data structures for the digital components. The set of cells include a respective cell for each digital component in the digital component database, and the respective cell for each digital component includes the values of the bits of at least one of the one or more respective probabilistic data structures for the digital component. To obtain the set of candidate digital components, the computer system can query the one or more digital component databases using the constructed query by evaluating, for each digital component in the digital component database, the Boolean expression based on the values of the bits in the respective cell for the digital component.

At 340, the computer system selects, from the candidate digital components, one or more digital components. At 350, the computer system provides the one or more digital components to the client device for presentation to the user.

Figure 4:
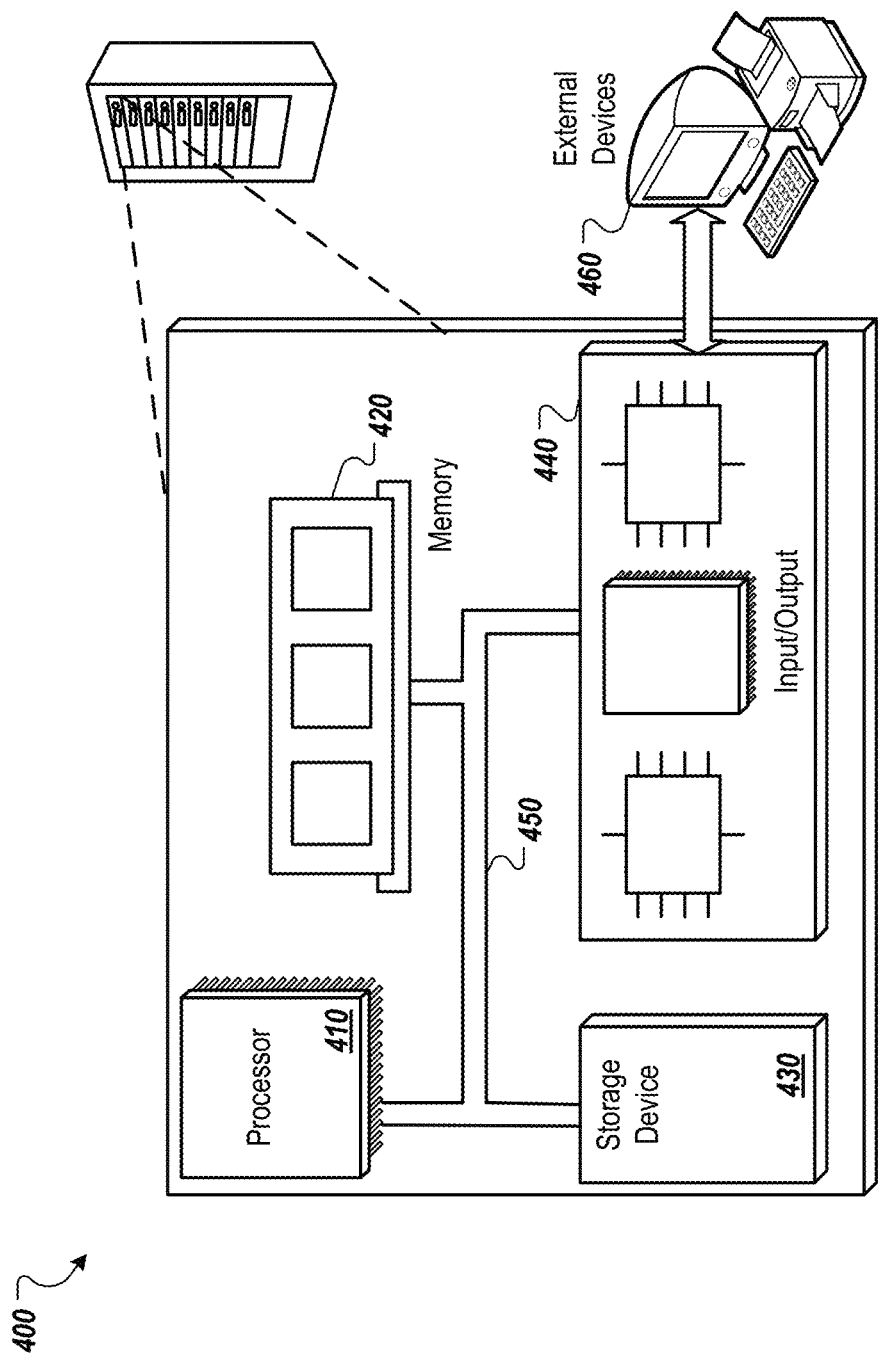
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a trusted server communicatively coupled to one or more digital component databases, the method comprising:
    receiving, by the trusted server from a client device of a user, a request comprising a user membership probabilistic data structure encoding user membership information that indicates membership of the user in one or more user groups of a plurality of user groups, wherein each user group of the plurality of user groups has a respective unique group identifier that identifies the user group;
    constructing, by the trusted server, based on the user membership probabilistic data structure, a query for identifying candidate digital components that are eligible for distribution to users that are members of the one or more user groups;
    obtaining, by the trusted server, a set of candidate digital components by querying the one or more digital component databases using the constructed query, wherein each digital component database comprises a set of cells along a row or column of the digital component database for storing values of bits of the one or more respective probabilistic data structures for the digital components, the set of cells include a respective cell for each digital component in the digital component database, and the respective cell for each digital component comprises the values of the bits of at least one of the one or more respective probabilistic data structures for the digital component, and obtaining the set of candidate digital components by querying the one or more digital component databases using the constructed query comprises evaluating, for each digital component in the digital component database, a Boolean expression based on the values of the bits in the respective cell for the digital component;
    selecting, from the candidate digital components, one or more digital components; and
    providing the one or more digital components to the client device for presentation to the user.

2. The computer-implemented method of claim 1, wherein the probabilistic data structure comprises one of a Bloom filter or a cuckoo filter.

3. The computer-implemented method of claim 1, wherein each digital component database comprises the set of digital components and, for each digital component, one or more respective probabilistic data structures that each encodes a user group to which the digital component is eligible to be distributed.

4. The computer-implemented method of claim 3, wherein constructing the query comprises generating the Boolean expression based on values of bits of the user membership probabilistic data structure and values of bits of the one or more respective probabilistic data structures for each digital component in the set of digital components.

5. The computer-implemented method of claim 4, wherein the client device generates the user membership probabilistic data structure by:
    generating, for each individual user group that includes the user as a member and using a given hash function, a hash value based on a combination of (i) the unique group identifier for the individual user group and (ii) a unique owner identifier for an owner of the individual user group;
    selecting, for each hash value, a predefined number of bits of the hash value, wherein the predefined number of bits is greater than one but less than all of the bits of each hash value; and
    populating the user membership probabilistic data structure using the selected predefined number of bits for each individual user group that includes the user as a member.

6. The computer-implemented method of claim 5, wherein:
    the user membership probabilistic data structure comprises a Bloom filter bit array; and
    populating the user membership probabilistic data structure using the selected predefined number of bits for each individual user group that includes the user as a member comprises:
        determining, using the respective predefined number of bits of the respective individual user group, a respective set of bit positions in the Bloom filter bit array; and
        setting each of elements at the determined set of bit positions of the Bloom filter bit array to a value of 1.

7. The computer-implemented method of claim 6, wherein the Boolean expression includes, for each respective probabilistic data structure of the one or more probabilistic data structures in the digital component database, a respective Boolean operation on the bits of the Bloom filter bit array and the bits in the respective probabilistic data structure.

8. The computer-implemented method of claim 5, wherein:
    the user membership probabilistic data structure comprises a cuckoo filter array; and
    populating the user membership probabilistic data structure using the selected predefined number of bits for each individual user group that includes the user as a member comprises:
        determining, using the respective predefined number of bits of the respective individual user group, a respective tag bit string and a set of possible positions for inserting the tag bit string into the cuckoo filter array; and
        inserting the respective tag bit string into the cuckoo filter array at one of the set of possible positions.

9. The computer-implemented method of claim 8, wherein the Boolean expression includes, for each respective probabilistic data structure of the one or more probabilistic data structures in the digital component database, a respective Boolean operation for checking tag bit string matching at the set of possible positions in the cuckoo filter array.

10. A system comprising:
    one or more computers of a trusted server communicatively coupled to one or more digital component databases; and one or more storage devices storing instructions that when executed by the one or more computers, cause the one or more computers of the trusted server to perform operations comprising:
receiving, from a client device of a user, a request comprising a user membership probabilistic data structure encoding user membership information that indicates membership of the user in one or more user groups of a plurality of user groups, wherein each user group of the plurality of user groups has a respective unique group identifier that identifies the user group;
constructing, based on the user membership probabilistic data structure, a query for identifying candidate digital components that are eligible for distribution to users that are members of the one or more user groups;
obtaining a set of candidate digital components by querying one or more digital component databases using the constructed query, wherein each digital component database comprises a set of cells along a row or column of the digital component database for storing values of bits of the one or more respective probabilistic data structures for the digital components, the set of cells include a respective cell for each digital component in the digital component database, and the respective cell for each digital component comprises the values of the bits of at least one of the one or more respective probabilistic data structures for the digital component, and obtaining the set of candidate digital components by querying the one or more digital component databases using the constructed query comprises evaluating, for each digital component in the digital component database, a Boolean expression based on the values of the bits in the respective cell for the digital component;
selecting, from the candidate digital components, one or more digital components; and
providing the one or more digital components to the client device for presentation to the user.

11. The system of claim 10, wherein the probabilistic data structure comprises one of a Bloom filter or a cuckoo filter.

12. The system of claim 10, wherein each digital component database comprises a set of digital components and, for each digital component, one or more respective probabilistic data structures that each encodes a user group to which the digital component is eligible to be distributed.

13. The system of claim 12, wherein constructing the query comprises generating the Boolean expression based on values of bits of the user membership probabilistic data structure and values of bits of the one or more respective probabilistic data structures for each digital component in the set of digital components.

14. The system of claim 13, wherein the client device generates the user membership probabilistic data structure by:
generating, for each individual user group that includes the user as a member and using a given hash function, a hash value based on a combination of (i) the unique group identifier for the individual user group and (ii) a unique owner identifier for an owner of the individual user group;
selecting, for each hash value, a predefined number of bits of the hash value, wherein the predefined number of bits is greater than one but less than all of the bits of each hash value; and
populating the user membership probabilistic data structure using the selected predefined number of bits for each individual user group that includes the user as a member.

15. The system of claim 14, wherein:
the user membership probabilistic data structure comprises a Bloom filter bit array; and
populating the user membership probabilistic data structure using the selected predefined number of bits for each individual user group that includes the user as a member comprises:
determining, using the respective predefined number of bits of the respective individual user group, a respective set of bit positions in the Bloom filter bit array; and
setting each of elements at the determined set of bit positions of the Bloom filter bit array to a value of 1.

16. The system of claim 15, wherein the Boolean expression includes, for each respective probabilistic data structure of the one or more probabilistic data structures in the digital component database, a respective Boolean operation on the bits of the Bloom filter bit array and the bits in the respective probabilistic data structure.

17. The system of claim 14, wherein:
the user membership probabilistic data structure comprises a cuckoo filter array; and
populating the user membership probabilistic data structure using the selected predefined number of bits for each individual user group that includes the user as a member comprises:
determining, using the respective predefined number of bits of the respective individual user group, a respective tag bit string and a set of possible positions for inserting the tag bit string into the cuckoo filter array; and
inserting the respective tag bit string into the cuckoo filter array at one of the set of possible positions.

18. One or more non-transitory computer-readable storage media storing instructions that, when executed by one or more computers, cause the one or more computers of a trusted server communicatively coupled to one or more digital component databases to perform operations comprising:
receiving, from a client device of a user, a request comprising a user membership probabilistic data structure encoding user membership information that indicates membership of the user in one or more user groups of a plurality of user groups, wherein each user group of the plurality of user groups has a respective unique group identifier that identifies the user group;
constructing, based on the user membership probabilistic data structure, a query for identifying candidate digital components that are eligible for distribution to users that are members of the one or more user groups;
obtaining a set of candidate digital components by querying one or more digital component databases using the constructed query, wherein each digital component database comprises a set of cells along a row or column of the digital component database for storing values of bits of the one or more respective probabilistic data structures for the digital components, the set of cells include a respective cell for each digital component in the digital component database, and the respective cell for each digital component comprises the values of the bits of at least one of the one or more respective probabilistic data structures for the digital component, and obtaining the set of candidate digital components by querying the one or more digital component databases using the constructed query comprises evaluating, for each digital component in the digital component database, a Boolean expression based on the values of the bits in the respective cell for the digital component;

selecting, from the candidate digital components, one or more digital components; and providing the one or more digital components to the client device for presentation to the user.

19. A computer-implemented method performed by a trusted server communicatively coupled to one or more digital component databases, the method comprising:

receiving, by the trusted server from a client device of a user, a request comprising a user membership probabilistic data structure encoding user membership information that indicates membership of the user in one or more user groups of a plurality of user groups, wherein each user group of the plurality of user groups has a respective unique group identifier that identifies the user group, wherein the client device generates the user membership probabilistic data structure by:

generating, for each individual user group that includes the user as a member and using a given hash function, a hash value based on a combination of (i) the unique group identifier for the individual user group and (ii) a unique owner identifier for an owner of the individual user group;

selecting, for each hash value, a predefined number of bits of the hash value, wherein the predefined number of bits is greater than one but less than all of the bits of each hash value; and populating the user membership probabilistic data structure using the selected predefined number of bits for each individual user group that includes the user as a member;

constructing, by the trusted server, based on the user membership probabilistic data structure, a query for identifying candidate digital components that are eligible for distribution to users that are members of the one or more user groups;

obtaining a set of candidate digital components by querying one or more digital component databases using the constructed query;

selecting, from the candidate digital components, one or more digital components; and providing the one or more digital components to the client device for presentation to the user.

* * * * *